Patented Apr. 28, 1936

2,038,609

UNITED STATES PATENT OFFICE 2,038,609

COMPOUNDS CONTAINING A MERCAPTIDE GROUP AND METHOD OF PRODUCING SAME

Erwin Schwenk, Berlin-Westend, and Max Gehrke, Berlin-Halensee, Germany, assignors to Schering-Kahlbaum A. G., Berlin, Germany No Drawing. Application May 1, 1931, Serial No. 534,452. In Germany May 10, 1930

5 Claims. (Cl. 260—54)

Our invention relates to a new kind of organic compounds adapted for use as remedies and more especially to compounds containing a mercaptide group. It is an object of our invention to provide means whereby such compounds can be produced in a particularly favorable manner.

As is well known to those skilled in the art chemical compounds having a therapeutical value and containing heavy metals are produced frequently from organic compounds containing a reactive mercaptide group.

We have now found that the salts of compounds corresponding to the general formula $C_n(H_2O)_n$, wherein $n$ is 2 or a higher integer, can be produced readily and with particularly good yield by causing a compound of this kind comprising a reactive halogen atom to react with an alkali salt of a thio acid corresponding to the formula $R-CO.SH$ wherein $R$ is an aliphatic or aromatic radical and converting the thio ester thus produced into the mercaptide compound by saponification. The saponification can be carried through with the aid of an alcoholic ammonia solution or of alcohol and an alkali metal or an alcoholate.

This reaction occurs according to the general equations:

(1) $R_1x + MSOC.R_2 = R_1-SOCR_2 + MX$ (2) $R_1-SOCR_2 + H_2O = R_1SH + HOOC.R_2$, wherein $x$ is halogen, so that $R_1x$ is an organic halogen compound, such as for instance benzyl chloride, bromomethylsulfo acid, bromo-anthraquinon, aceto-bromo-glucose or aceto-bromo glycerine aldehyde, while M is an alkali-forming metal or ammonium, so that $MSOCR_2$ is the alkali salt of a thio acid, for instance of thio acetic acid or thiobenzoic acid or some other aliphatic or aromatic acids.

Saponification according to Equation 2 can be carried through with the aid of an alcoholic ammonia solution or of alcohol and an alkali metal or an alcoholate. The saponification causes the production of the salt of the mercaptide compound.

Example 1

41 grs. aceto-bromo glucose and 11 grs. potassium thioacetate are dissolved under heating in 100 ccm. methanol. During the boiling of the solution potassium bromide will separate out after some time. After the reaction has come to an end the solution is allowed to cool down, ample quantities of white needles of pentaacetyl thioglucose separating out, which are freed from potassium bromide by washing with water. After recrystallization from methanol the compound has a melting point of 121° C., it is soluble in the usual organic solvents, dissolves only with difficulty in benzene and is insoluble in water. By saponification with a solution of ammonia in methylalcohol according to the method described by Wrede in Zeitschrift für physiologische Chemie 119, p. 52, the ammonium salt of thioglucose is obtained.

The reaction occurs according to the following equations:

(1) 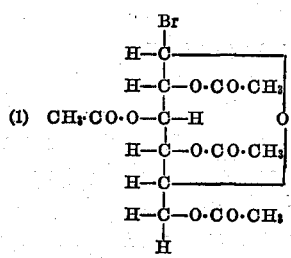　+K—S—CO·CH₃=CH₃CO·O—　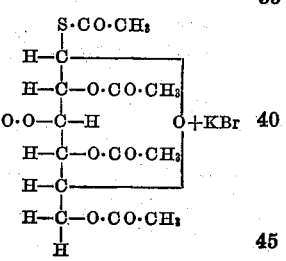　+KBr chloride, bromomethylsulfo acid, bromo-anthraquinon, aceto-bromo-glucose or aceto-bromo glycerine aldehyde, while M is an alkali-forming aceto bromo glucose+potassium thioacetate= pentacetyl thioglucose+potassium bromide.

formed besides potassium thioacetate 13,2 grs. potassium xylothionate, forming white crystals

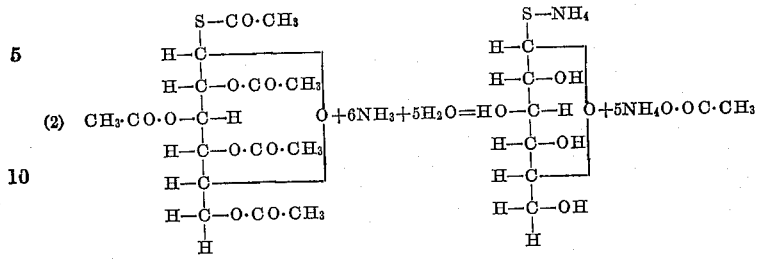

pentacetyl thioglucose + ammonia = ammonium thioglucosate+ammonium acetate.

Example 2

If 19 grs. gamma acetoxy alpha bromo alpha beta propylene oxyde (described by H. O. L. Fischer and Taube in Berichte der deutschen chemischen Gesellschaft 60 p. 1705), 11 grs. potassium thioacetate and 300 ccm. methanol are treated as described with reference to Example 1, there is obtained gamma acetoxy alpha acetyl thio alpha beta propylene oxyde forming white needles melting at 160° C. and being soluble in pyridine and benzene, less readily soluble in methanol and insoluble in benzene and water. By saponification of this compound a salt (corresponding to the saponifying agent used) of the gamma oxy alpha thio alpha beta propylene oxyde is obtained. These salts are colorless compounds dissolving readily in water, less readily in alcohol and being precipitated in crystalline form from their alcoholic solutions by ether or petrol ether. With the salts of heavy metals the heavy metal salts of gamma oxy alpha thio alpha beta propylene oxyde are formed by double conversion. The reaction occurs according to the following equations:

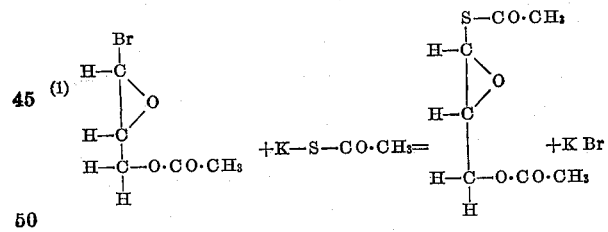

gamma acetoxy alpha bromo alpha beta propylene oxyde+potassium thioacetete=gamma acetoxy alpha acetylthio alpha beta propylene oxyde+potassium bromide

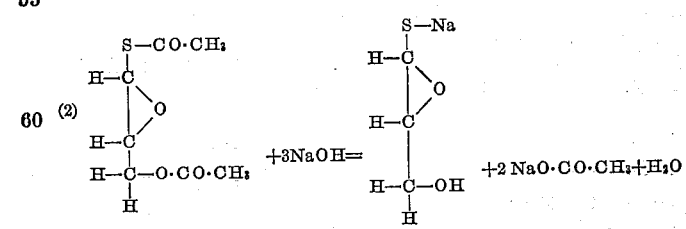

Example 3

If 34 grs. aceto-bromo-xylose are boiled during 5 minutes with a solution of 12 grs. potassium acetate in 150 ccm. ethyl alcohol, the mixture being treated as described with reference to Example 1, there result 22,6 grs. tetraacetyl-xylose melting at 99° C. By saponifying this compound with potassium ethylate, which has been obtained by dissolving 2,57 grs. potassium in 100 ccm. absolute ethyl alcohol, there is melting at 160–165° C. and dissolving readily in water, less readily in alcohol, the compound being precipitated from its alcoholic solution by ether or petrol ether.

Example 4

In a similar manner 34 grs. aceto-bromoarabinose and 10 grs. sodium thioacetate will form 24,5 grs. tetraacetyl arabinothiose melting at 78° C. By saponification with sodium methylate (obtained by dissolving 1,38 grs. sodium in 75 ccm. methyl alcohol) this compound is decomposed into sodium thioacetate and sodium arabinothiosate (12,3 grs.). The sodium arabinothiosate forms white crystals which dissolve readily in water, less readily in alcohol and can be precipitated from their alcoholic solution by ether or petrol ether.

Example 5

In a similar manner reaction between gamma acetoxy alpha bromo alpha beta propylene oxyde and potassium thioacetate will result in the formation of gamma oxy alpha thio alpha beta propylene oxyde diacetate melting at 158° C., this compound being decomposable into sodium gamma oxy alpha thio alpha beta propylene oxyde and acetate by saponification with potassium alcoholate.

Various changes may be made in the details disclosed in the foregoing specification without departing from the invention or sacrificing the advantages thereof.

We claim:—

1. The method of producing an alkali metal mercaptide compound of a carbohydrate of the general formula $C_n(H_2O)_n$, wherein $n$ represents 3, 4, 5 or 6, which comprises reacting an acetohalogen compound of said carbohydrate with the salt of a thio acid and decomposing the ester thus obtained by saponification with a saponifying alkali metal compound to form a thiosate and a salt of the acid.

2. The method of producing an alkali salt of a mercapto carbohydrate compound of the general formula $C_nH_{2n-1}O_{n-1}.(SH)$, wherein $n$ is one of the integers 3, 4, 5, 6, comprising causing an acetyl derivative of the compound $$C_nH_{2n-1}O_{n-1}X,$$

wherein X is halogen, to react with the salt of a thio acid and decomposing the ester thus obtained by saponification with a saponifying alkali metal compound to form a thiosate and a salt of the acid.

3. The method of producing an alkali metal glucothiosate comprising acting on aceto-bromoglucose with alkali metal thioacetate and decomposing the pentacetyl thioglucose which has formed in the reaction into alkali metal thioglucosate and alkali metal acetate by saponification with a saponifying alkali metal compound.

4. The method of producing an alkali metal salt of gamma oxy alpha thio alpha beta propylene oxyde comprising causing reaction between gamma acetoxy alpha bromo alpha beta propylene oxyde and alkali metal thioacetate and decomposing the gamma acetoxy alpha acetyl thio alpha beta propylene oxyde formed in the reaction by saponification with a saponifying alkali metal compound.

5. As a new product an alkali metal salt of gamma oxy alpha thio alpha beta propylene oxide being colorless, dissolving readily in water, less readily in alcohol and being precipitated in the form of crystals from its alcoholic solution by ether or petrol ether.

ERWIN SCHWENK.
MAX GEHRKE.